United States Patent [19]
Witt et al.

[11] 3,887,786
[45] June 3, 1975

[54] MERCHANDISING DEVICE FOR MAINTAINING FOOD PRODUCT UNITS IN A UNIFORMLY HEATED CONDITION

[75] Inventors: Allan E. Witt; Bernard G. Koether, both of Westport, Conn.

[73] Assignee: Food Automation Service Techniques Inc., Stratford, Conn.

[22] Filed: Oct. 26, 1973

[21] Appl. No.: 409,797

[52] U.S. Cl. ........... 219/214; 34/88; 99/341; 99/421 V; 211/163; 219/218; 219/349; 219/386; 219/388; 219/405; 312/114
[51] Int. Cl. ........................... H05b 1/00
[58] Field of Search ........... 219/214, 218, 219, 220, 219/244, 347, 349, 385, 354, 386, 387, 388, 405, 411, 521; 99/339, 341, 421 P, 421 HV, 421 V, 448, 443 R; 221/21, 120, 122; 34/88, 237; 126/41; 108/94; 211/163, 1.5; 312/114

[56] References Cited
UNITED STATES PATENTS

| | | | |
|---|---|---|---|
| 2,156,860 | 5/1939 | Lucas et al. | 99/421 V |
| 2,261,514 | 11/1941 | Dimigan | 219/218 |
| 2,897,746 | 8/1959 | Hilgers | 99/443 R |
| 3,277,813 | 10/1966 | Luscher | 219/338 X |
| 3,456,579 | 7/1969 | Woods | 99/341 |
| 3,552,299 | 1/1971 | Patoka | 99/339 |
| 3,586,823 | 6/1971 | Schier | 219/347 |
| 3,636,299 | 1/1972 | Stewart, Jr. | 219/218 X |
| 3,648,010 | 3/1972 | Schier | 219/214 |
| 3,744,403 | 7/1973 | Castronuove | 99/421 V |

*Primary Examiner*—Volodymyr Y. Mayewsky
*Attorney, Agent, or Firm*—Haynes N. Johnson

[57] ABSTRACT

A merchandising device of the type arranged to store and display a group of food product units, such as individual pies cooked and sold in fast food restaurants, and further arranged to maintain the food product units in a heated condition ready for immediate serving during such storage and display. The merchandising device is characterized by a housing with an open front and sides, and a carousel means, mounted within the housing for rotation about a vertical axis, which has food supporting surfaces arranged to carry food product units thereon, and which is visible and accessible through the open front of the housing. Motor means rotate the carousel means and food product units, and a radiant heat lamp mounted in an upper portion of the housing emits heat and light downwardly evenly upon the entire carousel means to illuminate the food product units for display and to maintain them in a uniformly heated condition. The carousel means is coupled to the motor by means of separable frictionally engaging plates which permit the carousel to be removed for cleaning and which act as a slip clutch preventing motor overload.

7 Claims, 3 Drawing Figures

MERCHANDISING DEVICE FOR MAINTAINING FOOD PRODUCT UNITS IN A UNIFORMLY HEATED CONDITION

BACKGROUND OF THE INVENTION

1. Field of the Invention

The field of the present invention relates to merchandising devices of the type used by so-called fast food restaurants and others for storing and displaying a group of cooked food product units, such as individual apple pies or the like. The merchandising device displays the food product units in view of customers to stimulate buying, and because demand is uncertain, the merchandising device must also maintain the food product units in a heated, palatable condition during such storage and display.

2. Description of the Prior Art

Merchandising devices for storing and displaying a group of food product units in a heated condition are known. One such device simply provides a surface upon which the food product units are placed, and mounts one or more radiant heat lamps above the food product units to emit heat and light thereon. This arrangement is not fully satisfactory because it is difficult to maintain the different food product units at the same temperature, and because the device does little to attract notice.

Another merchandising device carries the food product units on a moving ferris wheel type support and mounts radiant heat lamps at a station adjacent the moving ferris wheel so that the food product units are successively brought into and out of the radiant heat. This arrangement also has not been fully satisfactory because it is difficult to maintain uniform heat across the width of the ferris wheel, because the removal of the food product units from the radiant heat either allows them to cool too much or requires that they be exposed to a very high temperature which may promote additional cooking, and because the ferris wheel construction is extremely difficult to clean.

Known constructions of merchandising devices thus have not satisfactorily solved the problems of advantageously displaying a group of food product units and, at the same time, uniformly maintaining them in a heated condition and providing easy cleaning and maintenance.

SUMMARY OF THE INVENTION

Objects of the present invention are to provide an improved merchandiser for storing and displaying a group of food product units and for maintaining the food product units in a heated condition during such storage and display, the merchandiser providing uniform heating of the food product units, permitting food carrying surfaces to be easily cleaned, and providing a high degree of visibility of the food product units for display purposes, while being relatively simple to construct, easy to maintain, and reliable in use.

In a preferred embodiment of the invention, the merchandiser for use in storing and displaying a group of food product units and for maintaining the food product units in a heated condition during such storage and display comprises a housing with an open front and carousel means visible and accessible through the open front of the housing and mounted within the housing for rotation about a vertical axis. The carousel means has food supporting surfaces arranged to carry the group of food product units thereon, and motor means rotate the carousel means and food product units. A radiant heat lamp means is mounted in an upper portion of the housing and is arranged to emit heat and light downwardly upon the food product units carried by the carousel means, thereby illuminating the food product units for display and maintaining the rotating food product units in a uniformly heated condition. In further aspects of the invention the heat lamp unit has a field of view encompassing the food supporting surfaces of the carousel means to continuously emit radiant heat upon each food product unit to increase the uniformity of temperature of the food product units on the carousel means. Additionally, the carousel means is mounted for ready detachment for cleaning, and in one aspect of the invention, is mounted by means of two frictionally engaging plates coupling the carousel means to the motor means, the plates being separable for ready removal of the carousel means, and functioning during rotation of the carousel means as a slip clutch to prevent motor overload.

Further objects, advantages and aspects of the invention will be pointed out in, or apparent from, the detailed description hereinbelow, considered together with the following drawings.

DESCRIPTION OF THE PREFERRED EMBODIMENT

Figure 1:
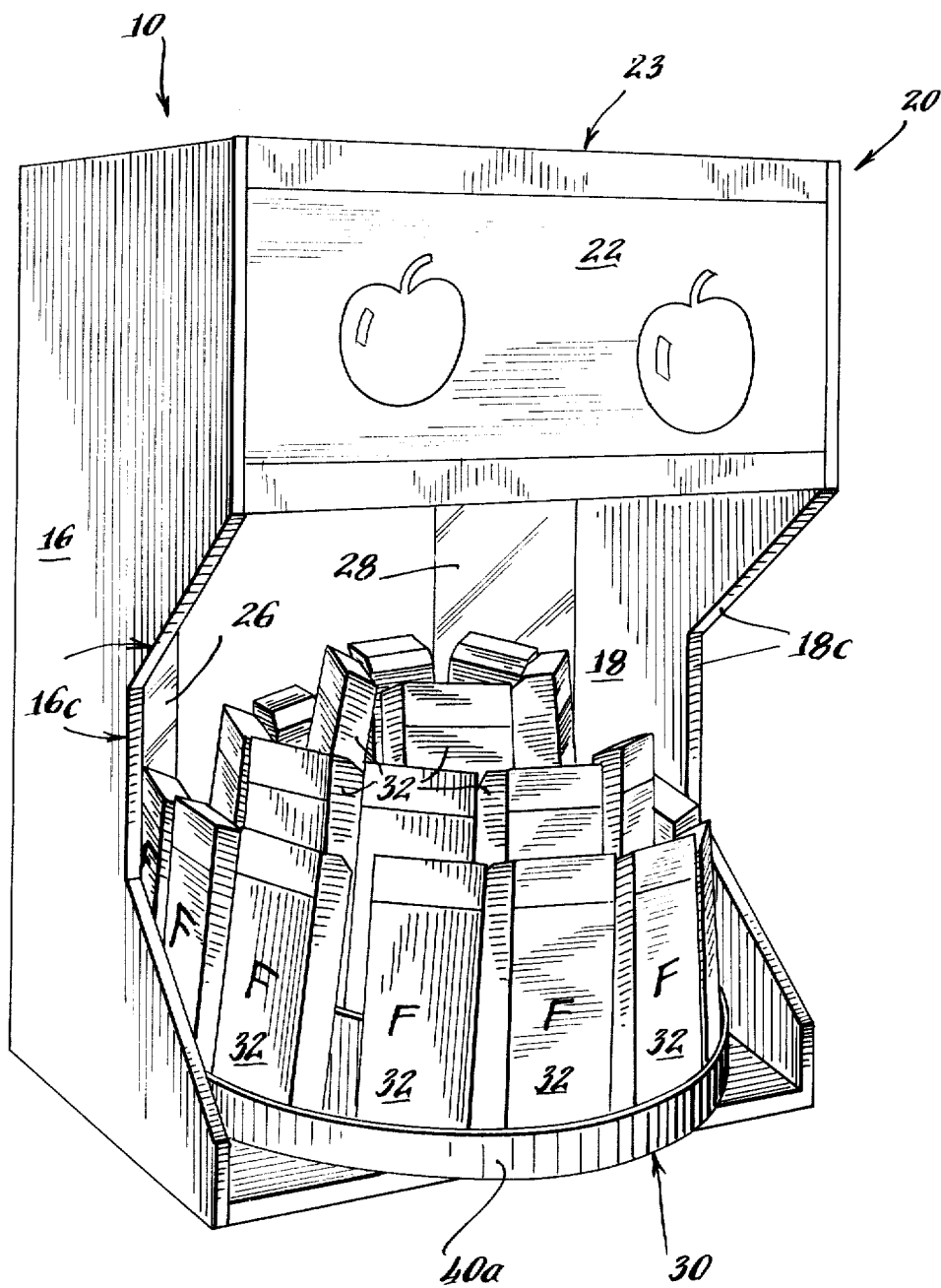
FIG. 1 is a perspective view, showing a merchandising device in accordance with the present invention.

FIG. 1 illustrates a merchandising device 10 in accordance with the present invention and having a housing 12 formed with an open front portion, a bottom wall 14, vertical side walls 16 and 18 with cutaway portions 16c and 18c, and an upper housing portion 20 with a front display panel 22 (for example, a film transparency with advertising or other display indicia thereon), a top wall 23, a back wall 24, and a partial bottom wall 25. At the rear interior corners of housing 12, reflectors 26 and 28 angle inwardly at an angle of about 45 degrees from side walls 16 and 18 (see FIG. 3). Between reflectors 26 and 28, and below back wall 24, housing 12 has an open back portion.

Figure 2:
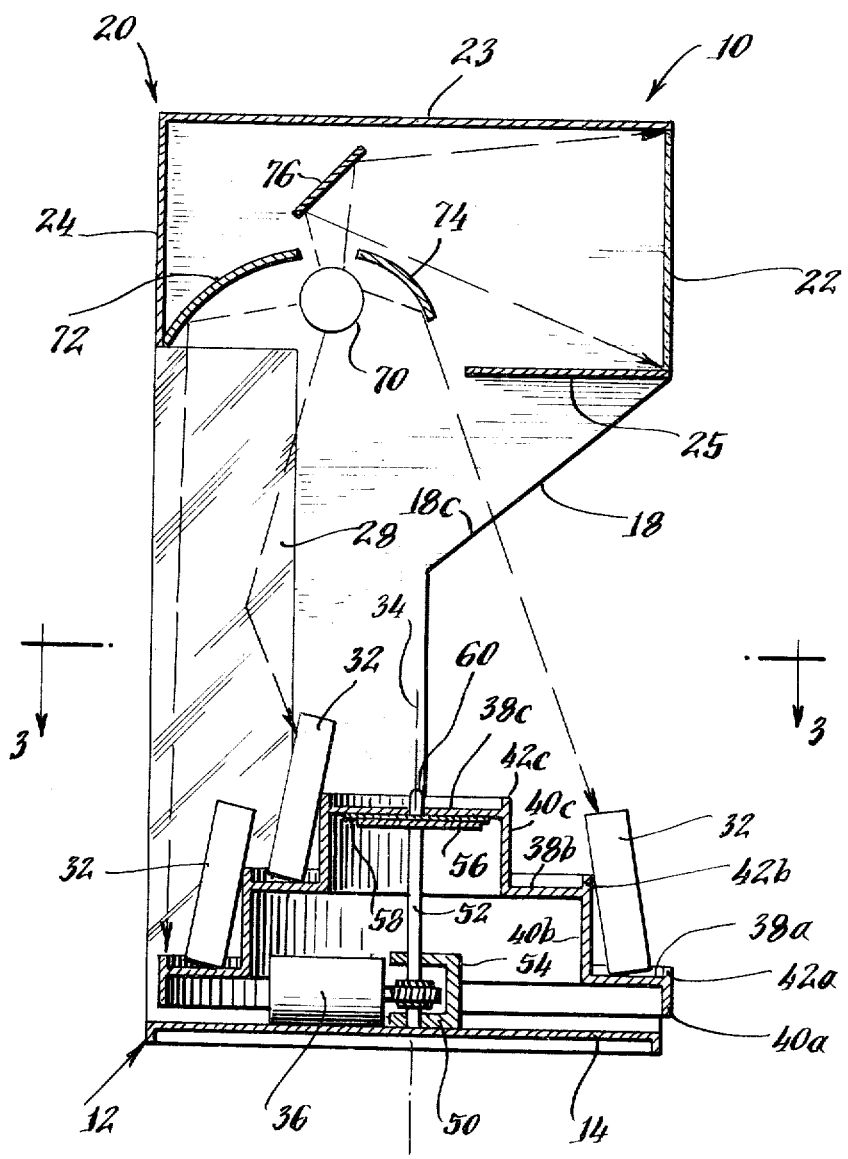
FIG. 2 is a vertical side section of the device of FIG. 1.
Figure 3:
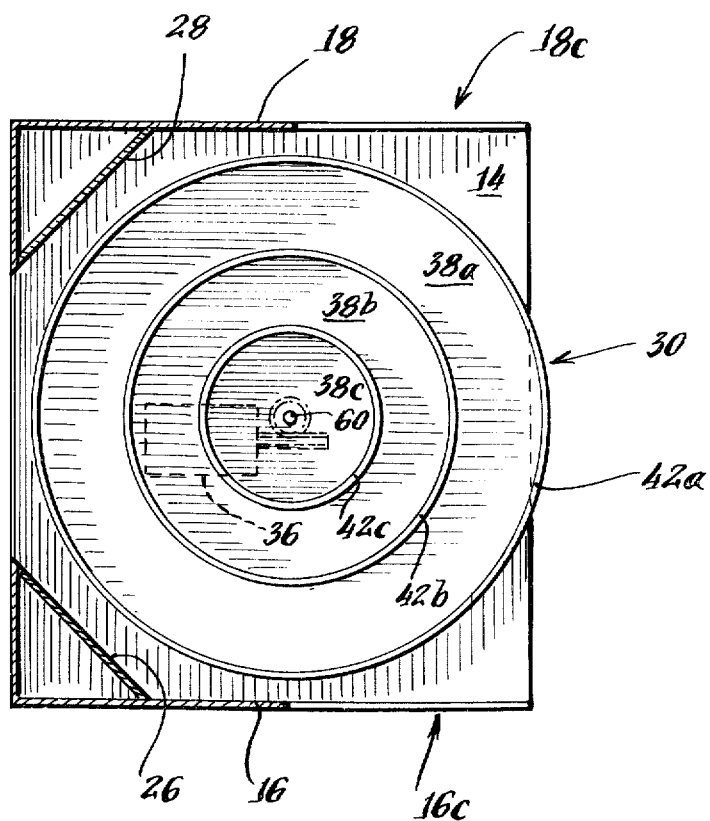
FIG. 3 is a horizontal section taken on line 3—3 of FIG. 2.

Within housing 12, merchandising device 10 mounts a carousel unit 30 which carries a group of food product units 32 thereon. As shown in FIGS. 2 and 3, carousel unit 30 is mounted for rotation about a vertical axis 34, and is rotated about that axis by a motor 36 at a speed, for example, of approximately 1.5 revolutions per minute. The carousel unit preferably is of unitary molded heat-resisting plastic construction with a smooth, joint-free surface for ease of cleaning, and is arranged with annular food supporting surfaces 38a, 38b and 38c forming centrally elevated tiers, so that the food product units 32 on carousel unit 30 are displayed in overlapping fashion for greater visibility. As shown in FIG. 2, for example, food supporting surfaces 38a through 38c join with cylindrical risers 40a through 40c which provide vertical separation between the food supporting surfaces and also provide outer rims 42a through 42c for the food supporting surfaces which act to confine food product units 32 on the carousel unit 30.

To further enhance the visibility of the food product units 32 on carousel unit 30, housing 12 is provided with the previously mentioned cutaway portions 16c and 18c in side walls 16 and 18 to enable the food product units 32 to be easily seen by those looking at the merchandising device obliquely.

As shown in FIGS. 2 and 3, the motor 36 driving carousel unit 30 is coupled by means of a speed-reducing gear coupling 50 to a vertical shaft 52 which is supported for rotation about vertical axis 34 by means of a mounting bracket 54. Shaft 52 carries at its upper end a horizontal plate 56 in frictional contact with a horizontal plate 58 carried by carousel unit 30. As shown in FIG. 2, plate 58 on carousel unit 30 may be a metal plate secured, e.g. with epoxy, to one of the food supporting surfaces 38, such as 38c. In order to register horizontal plates 56 and 58 for concentric rotation, one of the plates, such as 56, has a locator pin 60 arranged to fit within a corresponding hole in the other plate, such as 58.

Horizontal plates 56 and 58 are held in frictional engagement by gravitational forces and act as a slip clutch or coupling between motor 36 and carousel unit 30. Accordingly, if the carousel unit 30 is manually stopped either to load or remove food product units 32, no overload will be imparted to motor 36.

Moreover, the coupling arrangement afforded by horizontal plates 56 and 58 allows the carousel unit 30 to be easily removed simply by raising it vertically to disengage locator pin 60. The carousel unit 30 can then be easily cleaned, and because it includes no mechanically functioning parts, the carousel unit 30 may be placed directly in a dishwasher for thorough cleaning.

To supply heat uniformly to the food product units 32 carried on the carousel unit 30, merchandising device 10 mounts a radiant heat lamp 70, such as a 500 watt quartz lamp, in the upper portion 20 of housing 12. Lamp 70 is positioned above the carousel unit 30 to emit heat and light downwardly upon the food product units 32 carried by the carousel unit, thereby illuminating the food product units for effective display, and maintaining the food product units in a uniformly heated condition.

As shown in FIG. 2, lamp 70 is located so that its unobstructed field of view extends over the entire carousel unit 30, and over the food supporting surfaces 38a through 38c, so that all the food product units 32 on the carousel unit continuously receive radiant heat. As a result of this arrangement, the food product units 32 are maintained at a substantially uniform temperature since they have no position of rapid cooling outside the influence of the radiant heating lamp 70.

As further shown in FIG. 2, the upper housing portion 20 mounts reflectors 72 and 74 in order to reflect heat and light emitted from lamp 70 to the carousel unit 32. In addition, as mentioned previously, housing 12 includes vertical reflectors 26 and 28 which act not only to reflect heat and light to the food product units 32 on carousel unit 30, but also serve to reflect an image of the food product units 32 through the open front of housing 12, thereby increasing the visible exposure of food product units 32.

As explained previously, front panel 22 of housing upper portion 20 may be a translucent substance, such as a film transparency. Rearward illumination for the front panel 22 is supplied by lamp 70 and reflector 76 arranged as shown in FIG. 2 to direct illumination to the rear surface of display panel 22.

Thus, as described above, a merchandising device has been provided which is simply constructed, and capable of mass construction but which is also very effective in displaying a food product unit and in maintaining food product units at a uniform temperature. The merchandising device permits the food carrying surfaces to be readily removed for cleaning and safeguards the motor from harm. These advantages are achieved in a merchandising device whose construction is neither unduly expensive nor complicated.

Although a specific embodiment of the invention has been disclosed herein in detail, it is to be understood that this is for the purpose of illustrating the invention, and should not be construed as necessarily limiting the scope of the invention, since it is apparent that many changes can be made to the disclosed structures by those skilled in the art to suit particular applications.

We claim:

1. A merchandiser of the type arranged to store and display a group of food product units and to maintain the food product units in a heated condition during such storage and display, comprising:
   a housing with an open front and means forming an upper housing portion,
   carousel means visible through the open front of the housing and mounted within the housing for rotation about a vertical axis and having upper food supporting surfaces arranged to carry said group of food product units thereon,
   the food supporting surfaces forming centrally elevated tiers for carrying food product units thereon for increased visibility and easier grasping thereof,
   motor means for rotating said carousel means and the food product units on the upper food supporting surfaces thereof,
   frictionally engaging slip clutch means for transmitting rotation from the motor means to the carousel means and for permitting the carousel means to be temporarily stopped from rotating without stopping the motor means,
   the slip clutch means having vertically separable elements removably mounting the carousel means within the housing for separation of the carousel means from the remainder of the merchandiser for cleaning, and
   radiant heat lamp means mounted to the upper housing portion above the carousel means and being arranged to emit heat and light downwardly upon the food product units carried by the upper food supporting surfaces of the carousel means for illuminating the food product units for display and for maintaining the rotating food product units in a uniformly heated condition,
   said radiant heat lamp means having a field of view substantially encompassing the food supporting surfaces of said carousel means, whereby each rotating food product unit thereon substantially continuously receives radiant heat, thereby increasing the uniformity of temperature of the food product units on the carousel means.

2. A merchandiser as claimed in claim 1 wherein said housing comprises reflector means arranged to direct heat and light emitted from the radiant heat lamp means upon the food product units carried by the carousel, said reflector means comprising vertical reflectors located at the rear corners of the housing and arranged to reflect an image of the food product units through the open front of the housing for additional display thereof.

3. A merchandiser as claimed in claim 1 wherein said carousel means has annular food supporting surfaces for carrying the food product units.

4. A merchandiser as claimed in claim 1 wherein said carousel means has a unitary construction with a smooth surface, thereby permitting easy cleaning of said carousel means.

5. A merchandiser as claimed in claim 1 wherein said slip clutch means comprises a first horizontal plate rotated by said motor means, and a second horizontal plate carried by the carousel means in frictional contact with the first horizontal plate.

6. A merchandiser as claimed in claim 5 wherein said first and second plates are registered for rotation by means of a locator pin on one plate and a hole on the other plate for receiving the locator pin.

7. A merchandiser as claimed in claim 1 wherein said housing comprises side walls, and wherein said side walls are provided with cutout portions adjacent said carousel means for increased visibility of the food product units thereon.

* * * * *